United States Patent
Welts

(10) Patent No.: US 7,509,530 B2
(45) Date of Patent: Mar. 24, 2009

(54) METHOD AND SYSTEM FOR USE IN RESTORING AN ACTIVE PARTITION

(75) Inventor: Frank Andrew Welts, San Luis Obispo, CA (US)

(73) Assignee: Sonic Solutions, Novato, CA (US)

(*) Notice: Subject to any disclaimer, the term of this patent is extended or adjusted under 35 U.S.C. 154(b) by 498 days.

(21) Appl. No.: 11/039,388

(22) Filed: Jan. 19, 2005

(65) Prior Publication Data
US 2006/0161811 A1 Jul. 20, 2006

(51) Int. Cl.
G06F 11/00 (2006.01)
(52) U.S. Cl. .............................. 714/15; 714/2; 714/38; 717/168; 713/2
(58) Field of Classification Search .................. 714/15; 713/2
See application file for complete search history.

(56) References Cited

U.S. PATENT DOCUMENTS

| | | | |
|---|---|---|---|
| 5,339,426 A | 8/1994 | Aoshima | |
| 5,604,862 A * | 2/1997 | Midgely et al. | 714/6 |
| 6,016,553 A | 1/2000 | Schneider et al. | |
| 6,173,417 B1 | 1/2001 | Merrill | |
| 6,199,178 B1 | 3/2001 | Schneider et al. | |
| 6,240,527 B1 | 5/2001 | Schneider et al. | |
| 6,289,355 B1 | 9/2001 | Haderle et al. | |
| 6,336,174 B1 | 1/2002 | Li et al. | |
| 6,594,780 B1 * | 7/2003 | Shen et al. | 714/15 |
| 6,594,781 B1 | 7/2003 | Komasaka | |
| 6,615,365 B1 * | 9/2003 | Jenevein et al. | 714/6 |
| 6,618,794 B1 | 9/2003 | Sicola et al. | |
| 6,636,963 B1 * | 10/2003 | Stein et al. | 713/1 |
| 6,732,293 B1 | 5/2004 | Schneider | |
| 6,802,029 B2 | 10/2004 | Shen et al. | |
| 6,931,522 B1 * | 8/2005 | Raghavan et al. | 713/2 |
| 6,952,697 B1 | 10/2005 | Rothschild | |
| 2001/0018717 A1 * | 8/2001 | Shimotono | 709/319 |
| 2002/0049883 A1 | 4/2002 | Schneider et al. | |
| 2002/0053044 A1 * | 5/2002 | Gold et al. | 714/38 |
| 2003/0046605 A1 | 3/2003 | Qin | |
| 2003/0188223 A1 | 10/2003 | Alexis | |
| 2004/0003314 A1 | 1/2004 | Witt et al. | |
| 2004/0078641 A1 | 4/2004 | Fleischmann | |
| 2004/0088692 A1 * | 5/2004 | Sutton et al. | 717/168 |
| 2004/0153724 A1 * | 8/2004 | Nicholson et al. | 714/6 |
| 2004/0158766 A1 | 8/2004 | Liccione et al. | |
| 2004/0172578 A1 * | 9/2004 | Chen et al. | 714/15 |

* cited by examiner

*Primary Examiner*—Robert Beausoilel
*Assistant Examiner*—Jeison C Arcos
(74) *Attorney, Agent, or Firm*—Fitch, Even, Tabin & Flannery

(57) ABSTRACT

The present embodiments perform active volume restores on actively running initial operating systems in an active partition. The methods identify available memory within a partition, duplicate at least a portion of an initial operating system image into the identified available memory providing a duplicate operating system, remap access from an initial operating system to the at least the duplicate operating system image, store a temporary operating system on to the partition, reboot into the temporary operating system, operate through the temporary operating system and store a restore operating system into the partition; and reboot into the restore operating system.

20 Claims, 7 Drawing Sheets

METHOD AND SYSTEM FOR USE IN RESTORING AN ACTIVE PARTITION

FIELD OF THE INVENTION

The present invention relates generally to restoring an operating system, and more particularly to restoring an active partition.

BACKGROUND

Computers, computing devices, processors, and other electronic devices have become an important and often essential aspect of businesses and individuals. These devices provide many advantages as well as significant cost benefits. However, because of this dependency, failures and down time of these devices result in wasted man hours, wasted resources, reduced productivity, and can rapidly becomes exceedingly costly.

Identifying and/or solving failures is time consuming and often difficult. Further, in many instances end users are technical unable to determine the causes of failures. Businesses typically employ numerous individuals simply to keep computers and systems up and running.

There are many products on the market that attempt to provide businesses and users with the ability to keep a computer or system operating. Some of these products duplicate or back up a system memory in case data is lost or no longer accessible from a certain computer or server. These products, however, are typically provided for disaster recover when a complete failure of a computer or system results. Further, these products often are complex to utilize and implement, and can often be very costly.

SUMMARY OF THE EMBODIMENT

The present invention advantageously addresses the needs above as well as other needs through the provisions of the methods and systems for use in restoring active partitions. The methods according to some embodiments identify available memory within a partition, duplicate at least a portion of an initial operating system image into the identified available memory providing a duplicate operating system, remap access from an initial operating system to the at least the duplicate operating system image, store a temporary operating system on to the partition, reboot into the temporary operating system, operate through the temporary operating system and store a restore operating system into the partition; and reboot into the restore operating system.

In other embodiments, methods are provided that perform an active volume restore an actively running initial operating system in an active partition. These methods duplicate the initial operating system in the partition, remap access to the initial operating system to the duplicate operating system, write a temporary operating system over at least a portion of the initial operating system, reboot the system into the temporary operating system, through the temporary operating system copy a restore operating system into the partition, and reboot into the restore operating system.

Some embodiments provide a processing system. The system includes a processor; memory coupled with the processor, the memory comprising a partition storing an initial operating system and a temporary operating system; means for duplicating the initial operating system on the partition such that the partition further comprises a duplicated operating system; means for remapping access for the initial operating system to the duplicated operating system; means for rebooting into the temporary operating system; means operable through the temporary operating system for retrieving a restore operating system and storing the restore operating system into the partition; and means for rebooting into the restore operating system.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
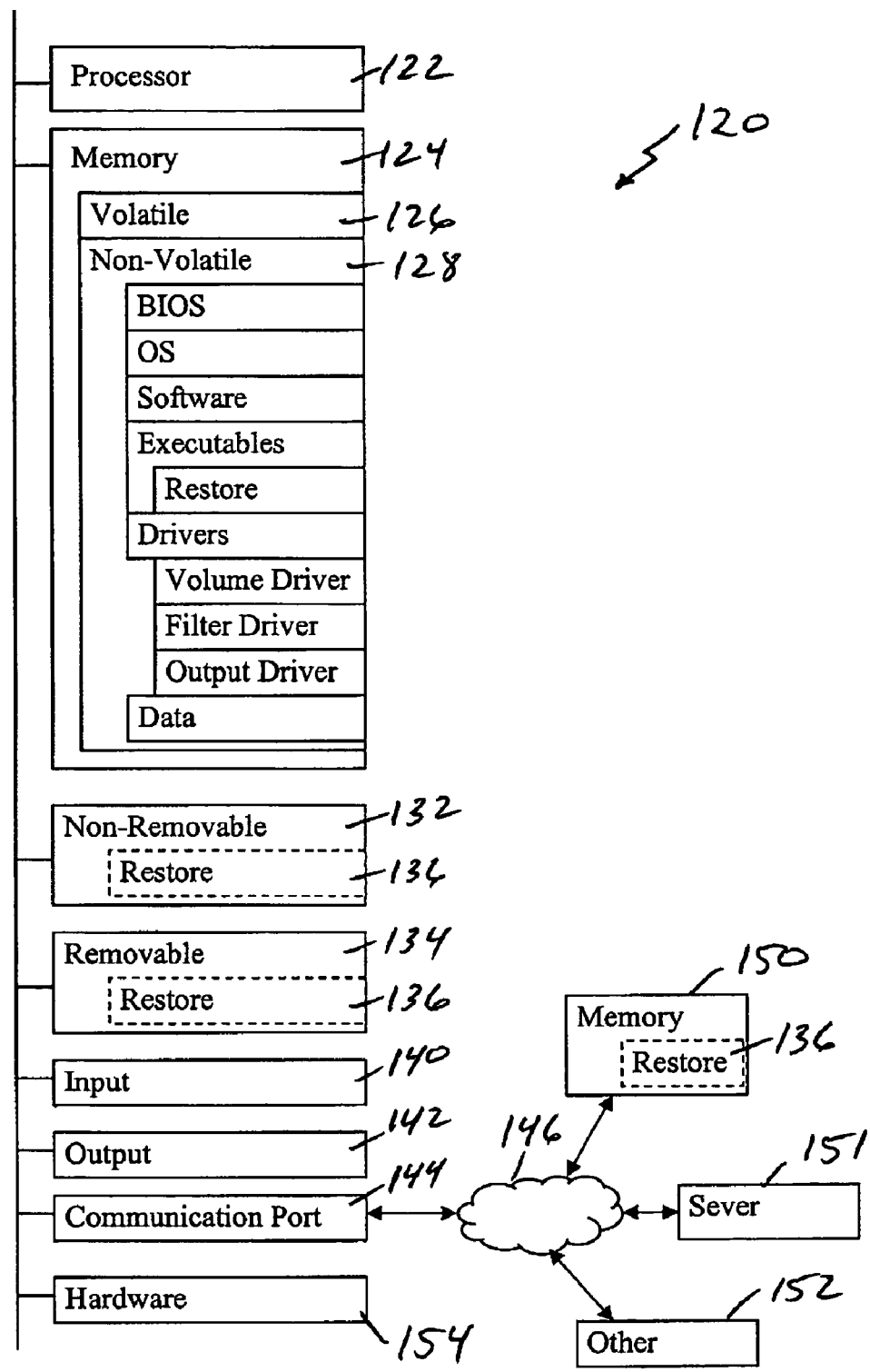
FIG. 1 depicts a simplified block diagram of a processing device or system according to some embodiments capable of for active volume restores.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The methods and systems of the present embodiments provide for the restoring of an active partition back to a defined state or image. An image is generally a copy of some or all of the data stored on a memory partition or volume, and is used to restore a partition to a state at the time the image was created. The image can be a single file, such as a single stream of data (e.g., sector by sector copy), consist of blocks of data, be multiple files, and other such configurations. The present embodiments utilize restore images to restore a partition or volume to a desired configuration, to set multiple computers with a similar or same configuration, to restore a partition in the event of damage or corruption, and other such implementations.

The restore provided through the present embodiments is achieved without the need for a separate, external boot disk.

Additionally, the restore is implemented within an active partition. As such, an additional partition is not needed to implement the restore provided by the present embodiments. The restore is achieved in part by duplicating an active operating system (OS) in the same active partition and rerouting access directed to the OS to the duplicated OS. Once the rerouting is initiated, a temporary OS is incorporated into the partition and the system is rebooted into the temporary OS that retrieves and stores a desired restore image with a restore OS into the partition and initiates a subsequent reboot into the restore OS returning the system to a desired image.

FIG. 1 depicts a simplified block diagram of a processing device or system 120 according to some embodiments. The processing system 120 typically includes at least one processing unit 122 (e.g., one or more microprocessors, or other such processing devices), and memory 124. The memory 124 can include volatile memory 126 (e.g., RAM), non-volatile memory 128 (e.g., ROM, flash memory, and other such non-volatile memory) and/or a combination of volatile and non-volatile memory. The non-volatile memory can store one or more OS, Basic Input-Output System code (BIOS), software, executables, drivers (e.g., communication drivers, filter driver, and other such drivers), data, and the like. In some embodiments, the processing system 120 further includes additional non-removable memory 132 and/or removable memory 134, such as magnetic disk drive, optical disk drive, and other relevant memory devices. The additional memory 132, 134, in some implementations, store a restore image and/or OS 136 for use in restoring the system 120 to a desired state as more fully described below.

In some embodiments, the processing system 120 further includes input device ports 140 that couple with one or more input devices, such as keyboards, remote controls, mouse, control buttons, and other similar input devices. Additionally, output driver ports 142 can further be included to drive out devices, such as a display, printer, and other such output devices.

The processor system further includes one or more communication ports or connections 144 that couple with additional circuitry and/or devices, and/or with a network 146 that allows the processor system to further communicate with remote devices 150-152 over the network, such as an intranet, the Internet, and other networks. For example, the processing system 120 can access additional remote memory 150 over the Internet, remote servers 151 to receive additional information and/or instructions, and other remote devices 152. The communication port 144 can provide wired and/or wireless communication. In some implementations, the system accesses the remote memory 150 to retrieve a restore image 136 as described below. The system 120 further includes and/or couples with additional hardware 154 that performs various functions as dictated by the device within which the system 120 is incorporated (e.g., display hardware, audio hardware, communication hardware (wired and/or wireless), and other such hardware).

The processor system 120 can be a stand alone computer, a computer coupled with a network, a server, a consumer electronics device (e.g., computer, server, television, set-top-box, Tivo® system, digital versatile disk (DVD) player, compact disc (CD) player, wireless telephone, personal digital assistant, and other consumer electronic devices), and substantially any other such electronic devices that include bootable processor systems.

Figure 2:
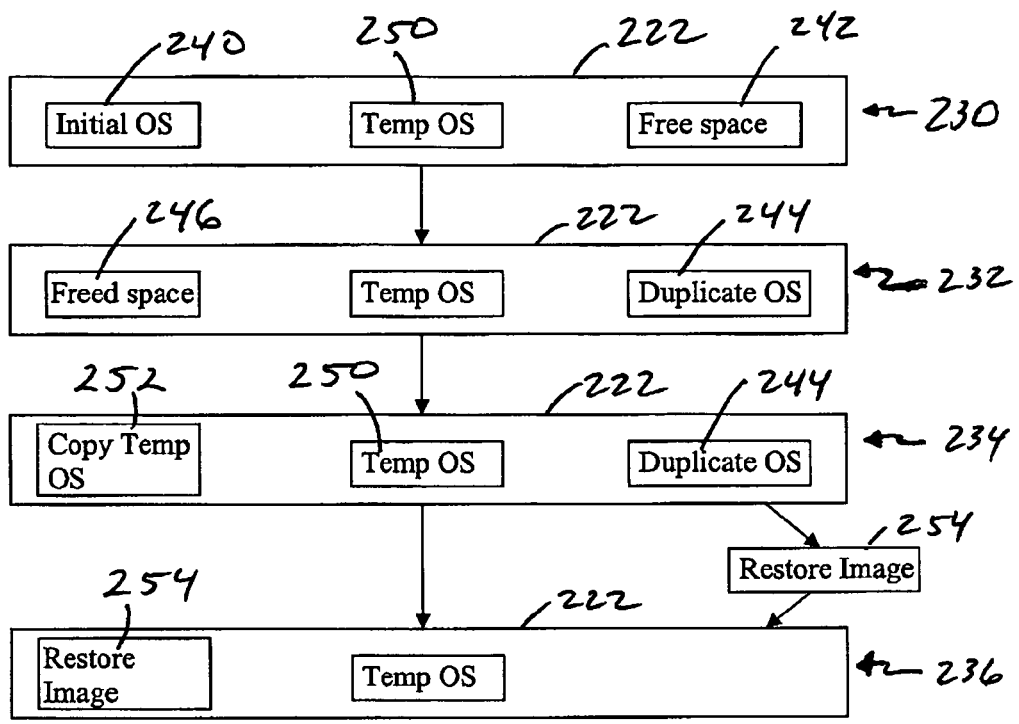
FIG. 2 depicts a simplified block diagram of a drive or volume of memory that is be returned or restored to a predefined image in accordance with some present embodiments.

FIG. 2 depicts a simplified block diagram of a volume or partition 222 of memory 124 that is be returned or restored to a predefined state or image in accordance with some present embodiments. At an initial stage 230, the drive 222 is active with an initial, currently active OS 240, such as Microsoft's Windows XP® operating on a drive (e.g., C:\\ drive). The initial OS 240 controls the start-up of the processor system 120, and controls the operation if the system 120 providing basic control and management of hardware 154, basic system operations, and/or running application software, for a current state of the system. When a user, the system, or an external device, wishes to restore the system to a predefined given state, the user or system activates the restore provided through the present embodiments. In some implementations, this restore is implemented through a restore application selected and/or activated through the initial OS (e.g., a "Restore" icon is provide through a windows manager that when selected activates a restore executable initiating the restore process). The system identifies a sufficient amount of free space 242 on the partition 222 where the initial operating system 240 can be copied or duplicated. In some implementations, the system 120 attempts to identify a contiguous amount of free space 242 as described fully below; however, some embodiments utilize non-contiguous available memory separated and/or distributed over the partition 222.

Once sufficient free space 242 is identified, the system transitions to state 232 where the initial OS 240 is duplicated 244 into the identified free space, effectively freeing up the initial memory 246 that stored the initial OS 240. In some embodiments, an initial operating system image, which can include the initial operating system, BIOS and other relevant operating parameters, is duplicated to the available memory. Further, the system remaps or reroutes attempted accesses to the initial OS instead to the duplicated OS 244 (e.g., using a filter driver 138 operating on the partition to control access to the partition). As such, any continued operations attempting to access the initial OS 240 continue to function appropriately by accessing the duplicate OS 244, and thus avoids failures of the system.

Once remapped, a subsequent stage 234 is entered where a temporary operating system 250, typically stored on the partition 222, is copied 252 to the beginning of the partition and, in some implementations, over at least a portion of the freed memory 246. The system continues to remap accesses to the duplicate OS 244 while the temporary OS is being copied. Once the temporary OS is copied, the system 120 reboots into the temporary OS 252, clearing out the working memory and booting up into the temporary OS 252. The system then operates from the temporary OS to initiate a retrieval of a desired, restore image or new image 254 into which the system is going to be restored. This restore image 254 can be stored in a portable medium 132 (e.g. CD, DVD, or other portable medium), a secondary memory 134 coupled with the system 120, a remote storage 150 accessible over a network 146, non-volatile memory 128, or other such memory.

Upon retrieval of the restore image 254, a final stage 236 is entered where the system copies the restore image onto the partition 222. Once the new restore image is stored into the partition, the temporary OS 252 again reboots the system into the restore OS 254 so that the system is restored to a desired state and operates from the restore image and OS 254. In some embodiments, the restore OS 254 is stored over the temporary OS 252 while the temporary OS operates from RAM 126. By operating the temporary OS from the RAM, the copying of the restore OS into the partition 222 does not adversely affect the operation of the temporary OS.

Figure 3:
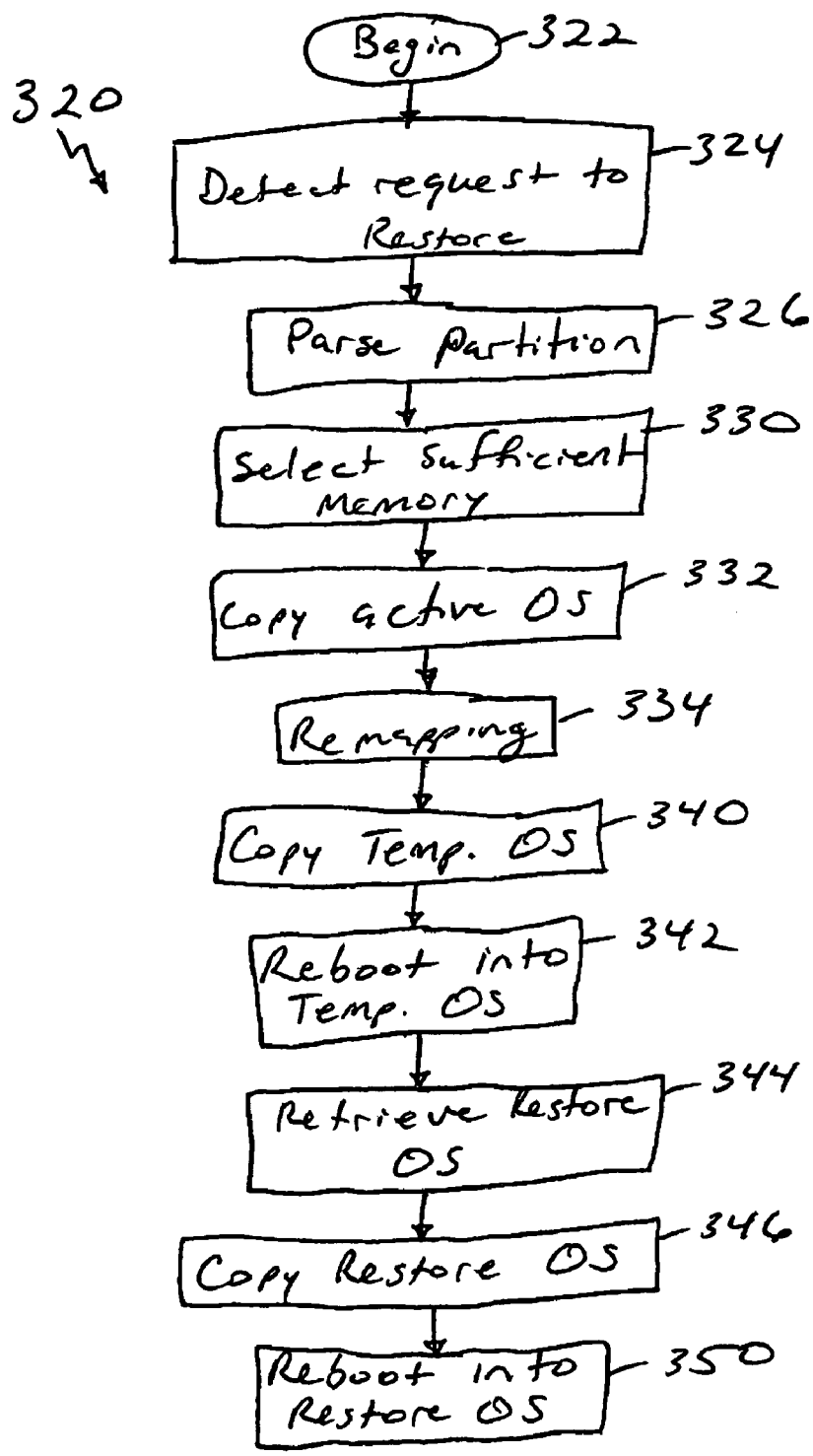
FIG. 3 depicts a simplified flow diagram of a process for use in restoring an active volume to the desired state of FIG. 2.

FIG. 3 depicts a simplified flow diagram of a process 320 for use in restoring an active volume to the desired state 236 of FIG. 2. The active volume restore allows the system 120 of FIG. 1 to be restored to a predefined operating state. The process 320 begins 322 with the system active and operating from a defined partition 222 of memory 124 with an active, initial operating system 240. The initial active OS can be substantially any operating system, such as Microsoft Windows®, Microsoft Windows XP®, Linux®, and substantially any other relevant operating system.

In step 324, the system detects a request to initiate a restore to a defined state. The request can be initiated externally by a user specifically instructing the system to restore to a desired state, the request can be a time based up-date activation initiated by the system 120, the restore can be activated from a remote device (e.g., a remote server operated by a manufacturer of the device within which the processor system 120 is incorporated) to provide an up-grade and/or bug fix, or other such requests. In step 326, the memory of the partition 222 is parsed to identify memory into which the currently active OS can be duplicated 242. In some implementations, the process 320 specifically looks for sufficient contiguous free space in the partition that can store a copy of the active OS. Utilizing contiguous free space simplifies the process as the duplicated OS does not have to be part of a file system, and additional over head is not needed to define where portions of the duplicated OS are stored over the partition 222. When non-contiguous memory is used, the system further maintains a mapping of the locations in the partition where portions of the OS are stored.

In step 330, the process selects a sufficient amount of memory. In step 332, the currently active OS 240 is copied to the identified available memory. In step 334, a mapping is generated that remaps accesses for the initial OS 240 to the duplicated OS 244. This maintains operation of the system while the process 320 continues. During the remapping process, access to the partition is typically monitored and controlled to maintain data consistency. In some embodiments, the monitoring process buffers write requests and the content to be written, and/or read requests. Additionally, some embodiments further provide a memory-allocation scheme that limits the amount of system resources consumed during remapping. Some implementations for example, allow write operations to pass through to memory blocks that have not yet been remapped hence allowing for a lower usage of system resources. The system further monitors changes once the remapping to the duplicate OS is completed.

In step 340, a temporary OS 252 is stored into the partition. In some implementations, the temporary OS is stored at the beginning of the partition and over at least a portion of the initial OS. The storing of the temporary OS over the initial OS does not adversely affect the operation of the system as attempts by the system to access the initial OS are redirected or remapped to the duplicate OS 244. In step 342, the process reboots the system into the temporary OS 252 on the active partition. Once the reboot is complete, the system operates through the temporary OS. In some embodiments, the temporary OS does not require active handles open on the partition, and instead operates from RAM 126, basically without the partition. Operating systems such as Microsoft Windows typically always have components active on the drive. Linux and other similar operating systems can function from the RAM and do not always have something active on the drive. Further, some embodiments employ a simplified and/or specifically configured Linux kernel that is configured to perform minimal functions to initiate the restore of a desired image as described fully below. Because Linux is an open ware system, the temporary OS can be configured to provide just the desired functionality. The use of the simplified temporary OS 252 reduces the memory needed to store the temporary OS and simplifies the operation of the temporary OS. Other operating systems can be employed, such as DOS and other operating systems that can be operated from RAM. In some implementations, the temporary OS can be retrieved from separate memory, such as a portable memory storage device (floppy disk, CD, DVD, and the like), remote memory or other storage, while in other implementations the temporary OS is copied from the partition 222.

The temporary OS removes the dependency on the previously active partition (e.g., open file handles, page files, and the like). Further, the temporary OS 252 provides a similar "hardware view" as that of the initial OS 240. As such, the temporary OS attempts to guarantee that discs, networks, buses, and other system resources and components can be found, and is configured to find a restore source image file and the target partition 222.

In step 344, the temporary OS accesses a requested restore OS image that will return the system to the desired state. In some embodiments, the temporary OS activates an image restore executable that retrieves the desired restore image. Typically, the restore OS is retrieved from a separate memory, such as a CD, DVD, remote memory 150, or some other separate memory. In step 346, the temporary OS copies the requested OS to the partition 222, for example, at the beginning of the partition over the temporary OS. In step 350, the temporary OS, for example, running from RAM, again reboots the system into the requested restore OS 254 such that the system 120 now operates from the requested OS at a predefined and desired state. As indicated above, some embodiments monitor changes following the remapping to the duplicate OS. Based on the monitoring, some embodiments further provide for the ability to roll-back changes made after restoring the temporary OS 252 and rebooting into the temporary OS but before restoring the selected restore image. The duplicating of the initial OS into a contiguous region of the partition can simplify this roll-back. The restore achieved through the process 320 is described as restoring an active partition of memory 124, but can similarly be applied to other memories such as Flash memory in embedded devices, and/or other relevant memory.

The process 320, in some embodiments, is implemented as a one click operation. Once the user selects to initiate the restore from the active OS 240, the process 320 does not require additional user input and restores to a predefined and/or desired image without further user interaction. Additionally and/or alternatively, some implementations provide users with additional functionality and/or options. Some of these functionalities and/or options are implemented by prompting the user for additional selections or input, as described more fully below.

Figure 4:
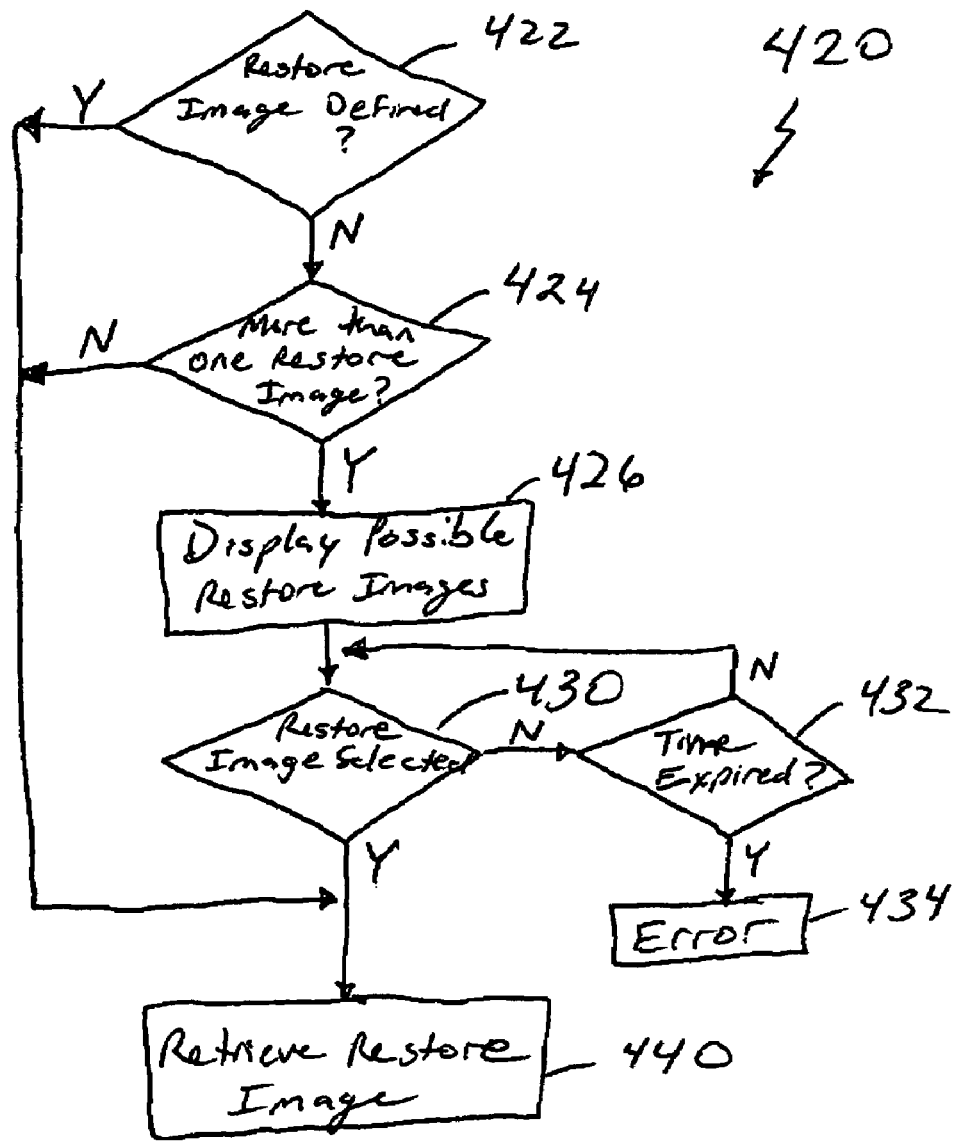
FIG. 4 depicts a simplified flow diagram of a process for use in retrieving a restore image.

FIG. 4 depicts a simplified flow diagram of a process 420 for use in retrieving a restore image according to some embodiments. In step 422 the process determines whether the restore image has been previously defined and/or selected. If the restore image has not been selected, step 424 is entered where it is determined whether there is more than one restore image that can be used. If there are more then one image, the process enters step 426 and displays a list of possible restore images and/or otherwise allows at least one of the possible images to be selected. In some implementations, more than one image can be used to restore a partition or drive 222. For example, one image may be an image of an OS, while one or more additional images are images of all or portions of data and/or files in the partition, such that the selection of just the first image restores an OS, while selection of the first along with the other one or more restore images restores part or all of the drive to a given state. In utilizing multiple images, the restore engine has knowledge about the file system on the target partition, including the starting location of the image(s)

as well as file system structures to define the location of the file/data set within the partition.

In step 430, the process determines whether a restore image has been selected. If an image has not been selected, the step 432 is entered where it is determined whether a time period has expired. If a time period has not expired the process returns to step 430. Alternatively, if the time period expires prior to a selection being detected, step 434 is entered where an error is generated. Alternatively, when an image is selected instep 430 or following step 422 when the image is previously selected, the process continues to step 440 where the image is retrieved for storing in the partition. Typically, the present embodiments can restore into substantially any valid and relevant image (assuming valid space) to substantially any relevant partition.

Referring back to FIG. 3, the process 320 allows the processor system 120 to be returned to a desired state. For example, the system 120 can be utilized for two different users (e.g., a day shift user, and a night shift user), and the process 320 can be employed to transition the system between a state for the day user and a state for a night user. Similarly, the process 320 allows the system to be returned to a state prior to changes being made to the system. For example, a factory image can be generated by a manufacturer and/or distributor of the system reflecting the state of the system at the time the system is delivered to a user. As another example, an image of the system can be generated by the user prior to incorporating additional software. Following the incorporation and/or use of such software, the user may desire to return the system back to the state prior to the incorporation of the software, perhaps due to errors or conflicts resulting from the incorporated software. By initiating the restore of the present embodiments, the active partition is restored to the desired state, without the need for a separate disk into which the system must be rebooted into to initiate and perform the restore process. The present embodiments perform a restore within the same partition by remapping the currently active OS, rebooting into a temporary OS that retrieves the desired state and/or OS, and initiating a reboot into the desired image.

The images and/or desired states can be supplied with the system (e.g., from the factory), generated by the user at some time prior to initiating the restore, and/or supplied to the system from an external source. For example as introduced above, the image of a system can be generated prior to loading new software onto the system. As another example, images of a partition can be periodically generated as a protection measure to protect against viruses, lost data and other events. If at a later period of time it is discovered that the system has downloaded a virus or some other error is occurring, the system can be restored to one of the previously generated images.

A restore image or state of a system can be generated through numerous applications (e.g., raw reads and/or block by block copy of the partition). There are many back-up systems available on the market that generate images of a system, many of which can be utilized to generate images that can be used by the present embodiments as a restore image. In some implementations, the present embodiments allow the user to initiate the image generation at their demand. The image backups can be generated based on a defined image backup format. Further, some implementations utilize knowledge of types and amount of compression, size of storage for image file(s), processor power, and intelligence of the temporary OS to decode the image file in generating the image backup based on a target machine and/or OS. The image backup in some embodiments uses an append image file format which can, in some implementations, better support multiple media types (e.g. append only media).

In some embodiments, backup images can be generated even when there is insufficient memory in the partition to store the additional image, by overwriting existing data/content that is identified to be overwritten. For example, if the partition is full but includes some data that can be overwritten, the system can generate the backup and compress the image and save the image over the identified data to be overwritten. As a further example, if a back up image already exists and is stored on the partition, a new back up image can be initiated with the new image being written over the previously stored image. Similarly, even when the partition is full, the restore of the temporary OS into the partition allow the temporary OS to retrieve and restore an image into the full partition as the restore image can replace all or a portion of the existing partition.

Once an image is generated, the system can be returned to that desired state. In some embodiments, the system 120 includes a filter driver 138 (see FIG. 1) that is utilized during an image generation to control the access to content while the image is being generated. The filter driver cooperates with the partition and filters requests to write and/or access content stored on the partition 222, and verifies that the portion or portions of the partition attempting to be written to or accessed have already been duplicated prior to allowing access to the content. If the portion(s) of the partition have not yet been duplicated, the filter driver initiates a copy of those portions and/or avoids writing until those portions are imaged. This avoids inconsistent image generation caused by changes to the partition while the image is being generated. In some embodiments, the filter driver employs an intelligent memory allocation scheme allowing the filter driver to buffer write operations directed to the partition being imaged. The memory allocation scheme can further be configured to maintain previous actions as reversible in the event the buffer space is depleted during operation. Read access to content is generally allowed during copying of the original OS 240 in generating the duplicate OS 244. Additionally in some implementations, the filter drive provides the remapping to the duplicated OS 244 while preparing to boot into the temporary OS 250.

Typically, the active restore provided through the present embodiments is maintained to a single partition 222. The initial, active OS 240 is duplicated within the partition, simplifying the remapping. Similarly, the temporary OS is activated within the same partition. The system and methods do not require an up-date of the master boot record on the hard disk, and do not require the generation of a new and/or separate partition. By avoiding the updating of the master boot record and generation of a separate partition, the present embodiments, simplify the restore process and avoid potentially additional data corruption. Further, maintaining the restore within a single partition avoids the need for external discs (which typically have to be purchased and/or maintain, can be lost, and other similar drawback associated with external discs), while providing easier end-user processing, and a one step automated or network/remote restore.

As introduced above, the present embodiments allow multiple images or states to exist, and further allows a user to select a desired one of those images to use in restoring the system. In some embodiments, the temporary OS activates a user interface, such as a graphic user interface (GUI). The user interface displays the potential restore images and allows the user to select the desired restore image. Similarly, the user interface can provide additional instructions to the user, allow additional options, identify errors or problems, and other such information.

Figure 5:
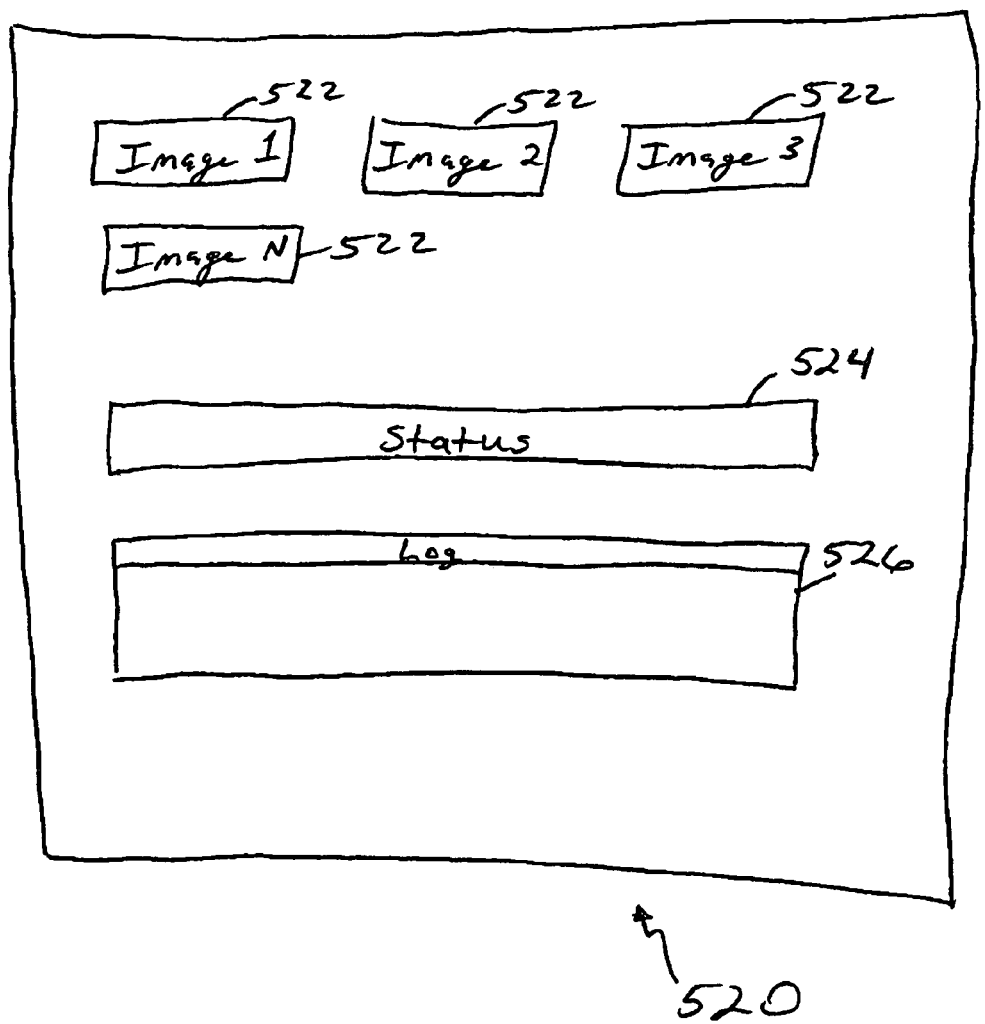
FIG. 5 depicts a simplified representation of a user interface generated by the temporary OS providing a user with added control over the active volume restore process.

FIG. 5 depicts a simplified representation of a user interface 520 generated by the temporary OS providing a user with added control over the active volume restore process. The user interface displays one or more icons and/or selectable elements 522 representing one or more restore images that a user can select (see step 426 of FIG. 4). Upon selecting one or more of the images, the temporary OS retrieves the selected image and completes the restore. In some embodiments, the user interface 520 optionally can display a status of the restore 524, prove a log of the process 526, request additional information and/or input (e.g., request to defragment the memory), display errors, and other such outputs and options.

Figure 6:
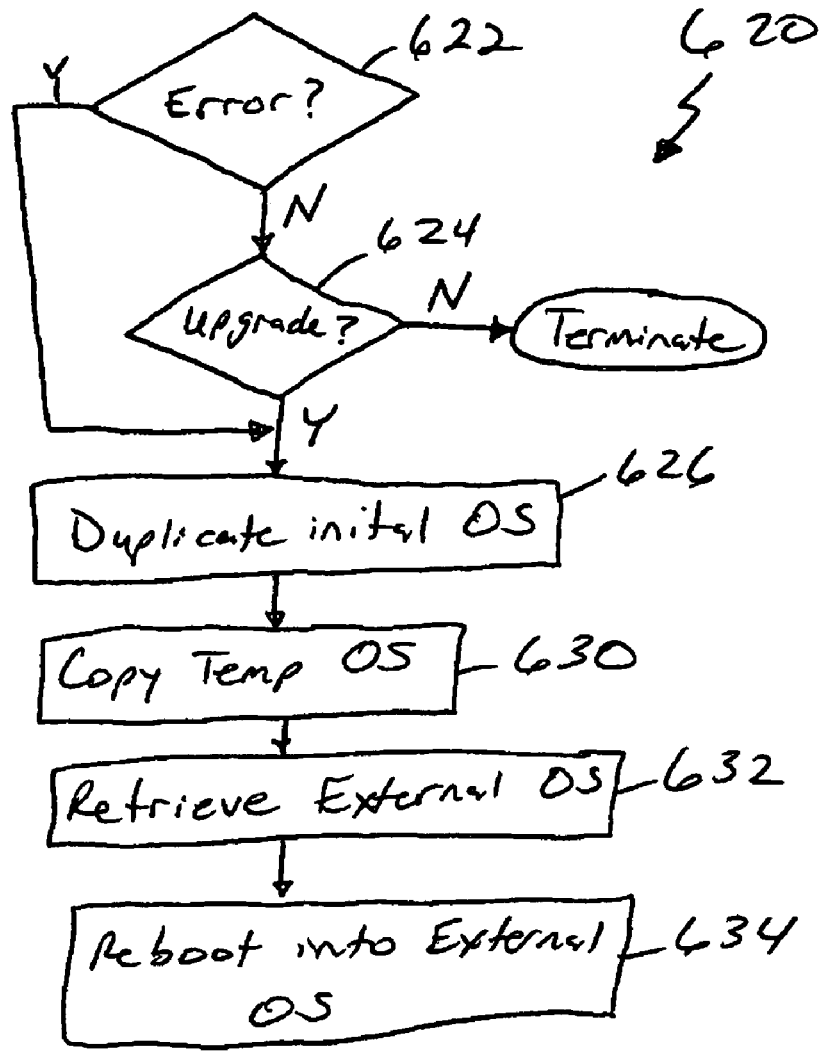
FIG. 6 depicts a flow diagram of a process for use in retrieving an up-grade or bug fix.

FIG. 6 depicts a flow diagram of a process 620 for use in retrieving an up-grade or bug fix according to some embodiments. As introduced above, the present embodiments allow a system 120 to be upgraded and/or restored from potentially fatal errors. The upgrade process 620 can be implemented for any number of situations. For example, an upgrade can be initiated: periodically to provide a system with further features and/or to operate more efficiently; when an external device (e.g., via a network) notifies the system that an upgrade is available; because one or more errors are detected; because a system cannot fully boot up; and other such reasons. In step 622, the process determines whether an error is detected that would initiate an upgrade. If an error is not detected, the process continues to step 624 where it is determined whether a signal (e.g., internally generated signal based on a pre-defined schedule, an external signal, or other signals) is received indicating an upgrade is to be initiated. If a signal is not detected, the process terminates.

The process alternatively continues to step 626 following steps 622 or 624 when an upgrade is to be initiated. In step 626, initial active OS is duplicated on the same partition and the system generates a remapping to the duplicated OS. In step 630, a temporary OS is copied to the beginning of the partition and the system is rebooted into the temporary OS. In step 632, the temporary OS initiates communication with an external device to retrieve the upgraded OS and/or image. For example, in some implementations, the temporary OS initiates communication over the Internet 146 to a remote server 151 that provides a new and/or upgraded image. Upon receipt of the upgraded image, step 634 is entered where the temporary OS copies the upgraded image to the beginning of the partition, and then activates a reboot into the upgraded image restoring the system to operation under the upgraded image.

The process 620 allows a system to be reactivated when an error is detected. Similarly, the process allows upgrades to be distributed to correct bugs in the system and/or to provide the system with potential upgrades (e.g., additional features, faster operation, and other such upgrades). For example, when a consumer electronics device attempts to boot-up, and an error is detected preventing the system from fully booting up, the BIOS can initiate a duplication of the operating system or at least a portion of an operating system image, such as the duplication of just the BIOS, onto the partition and remap access to the duplicated BIOS. A temporary OS stored locally on the active partition is then retrieved and copied onto the partition, typically over the initial OS. The BIOS then initiate a boot up into the temporary OS. The active temporary OS is a simplified OS that simply retrieves a restore image from a local flash memory or by contacting an external server (e.g., a manufacturer's server) to request a restore image. Upon receipt of the restore image, the temporary OS stores the restore image and restores the processing system into the new restore image allowing the system to again be booted up and operational.

In some further implementations of the present embodiments, electronic devices can include more than one OS, with one OS being a default OS with standard operations and functionality. One or more other upgraded operating systems can further be included in locked or protected states. The upgraded OS(s) can provide added features and/or functionality that are accessible to the consumer once the consumer is provided authorization to unlock, access, and restore into the upgraded OS. A consumer can optionally pay to gain access to an upgraded OS, once payment is received the upgraded OS can be unlocked, and the process 320 can be activated to restore the electronic device into the upgraded OS. For example, a DVD player can be manufactured with a basic OS and one or more upgraded OS(s) that are encrypted (e.g., an upgraded OS that enables digital theater system (DTS) audio support). The consumer can pay the distributor (e.g., store) and/or access the manufacturer's Internet site and pay for the upgraded OS. The electronic device can be supplied a decryption key once the upgrade is paid for or otherwise authorized, and the device uses the decryption key to decrypt the upgraded OS for DTS audio support. The process 320 is then activated to restore the DVD player into the upgraded OS, thus allowing DTS audio support. This allows manufacturers to deliver products that have various degrees of functionality, and to establish additional revenue streams.

Figure 7:
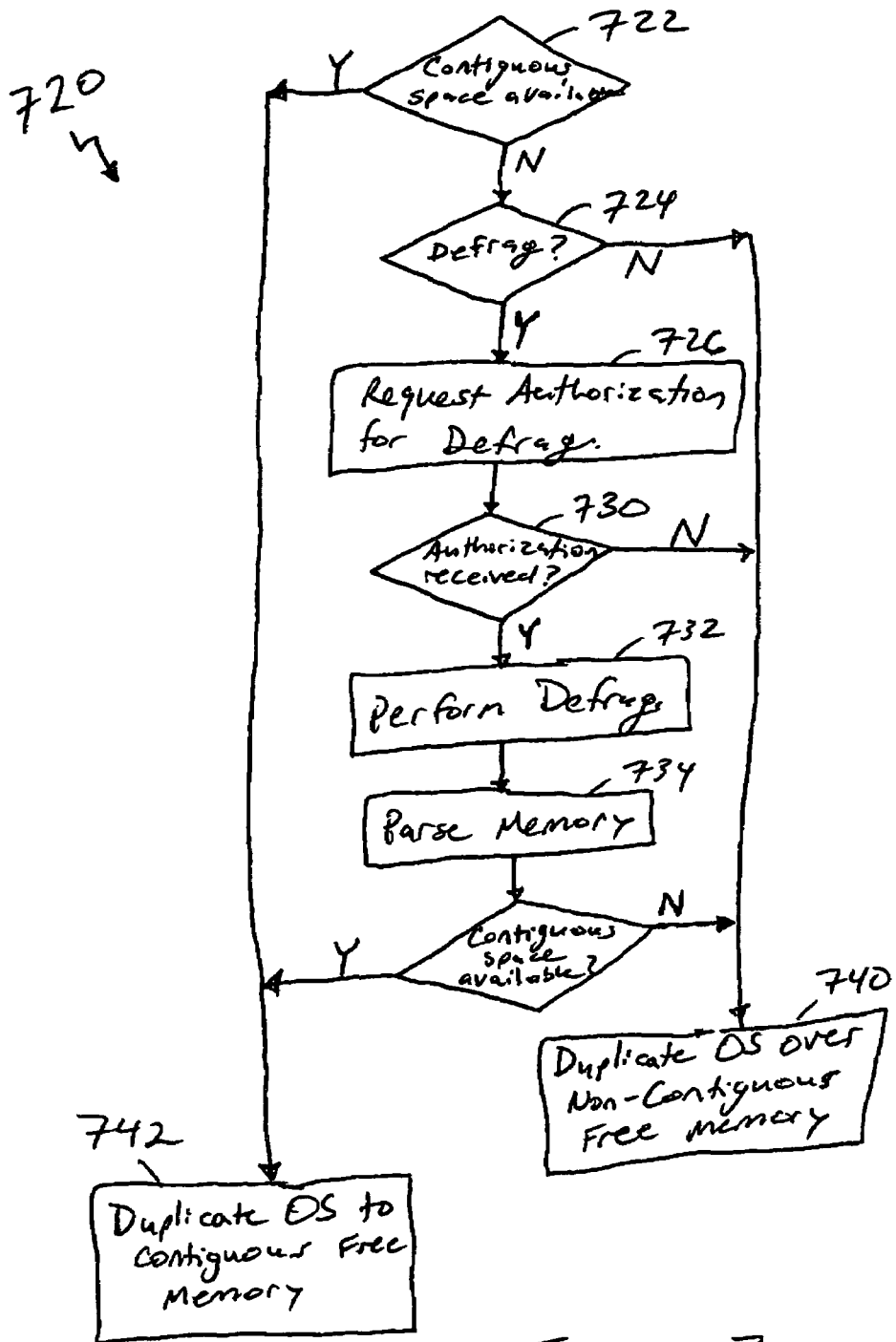
FIG. 7 depicts a simplified flow diagram of a process for attempting to acquire contiguous memory 242 in the partition.

As introduced above, some embodiments attempt to identify contiguous free space 242 that can be used to duplicate the initial, active OS 240. When contiguous space is not available, some implementations of the present embodiments attempt to obtain and/or open sufficient contiguous space. FIG. 7 depicts a simplified flow diagram of a process 720 for attempting to acquire contiguous memory 242 in the partition 222. In step 722 the process determines whether sufficient contiguous space is available, if there is sufficient space the process terminates. If insufficient contiguous space is available, step 724 is entered where the process determines whether a potential defragmenting application is available. If there is not a defragment process, the process continues to step 740. When there is a defragmenting application, step 726 is entered where authorization is requested from the user to initiate the defragmenting of the partition. In step 730, the process determines if authorization to defragment the partition is received. If authorization is not received the process continues to 740. If authorization is received, step 732 is entered where a defragmenting of the partition is preformed. In step 734 the process again parses the memory of the partition in an attempt to identify contiguous memory to duplicate the initial OS. In step 736, the process again determines whether sufficient contiguous space is available. If contiguous space is unavailable, step 740 is entered where the initial OS is duplicated over non-contiguous memory and additional mapping of the distributed initial OS is generated to identify the portions of the OS and where those portions are stored. Alternatively, when contiguous space is identified, step 742 is entered where the initial OS is duplicated to the contiguous space.

The present embodiments are useful for substantially any user on substantially any relevant system. The restore to a desired image can be utilized with hard disk partitions as well as Flash memory in embedded devices and other relevant memory. Additionally, the system can be utilized by information technology (IT) personnel of a company to restore systems to desired states. For example, IT personnel can utilize the present embodiments to restore a system to a known state to clear a system for a new employee, to remove a virus, and other such application.

The present embodiments provide an active volume or drive restore that restores the drive to a previous state. As such, users can restore a currently active partition (e.g., a bootable partition which is locked by a currently active operating system). This restore can be implemented without the use of a separate boot disk. The restore is activated, in some embodiments, from the main user interface and software reboots the system automatically without the need for a boot disk. The restore program reboots into a new, temporary disc image, which in turn runs the restore, generally, without additionally user intervention. The active volume restore provided by the present embodiments can be utilized with many different devices having bootable processor systems, and by substantially any user from a basic user, to power-users users, and/or information technology IT personnel.

Additionally, the present embodiments provide methods to restore a current active partition on an active system without prompting the user to create a boot disc. Furthermore, present embodiments provide for easier user interaction in the process of restoring an active partition.

While the invention herein disclosed has been described by means of specific embodiments and applications thereof, numerous modifications and variations could be made thereto by those skilled in the art without departing from the scope of the invention set forth in the claims.

What is claimed is:

1. A method for use in restoring an active partition, comprising:
    identifying available memory within a partition;
    duplicating, in response to identifying the available memory, an initial active operating system image into the identified available memory providing a duplicate operating system;
    remapping, in response to the duplicating the initial operating system, access from the initial operating system to the duplicate operating system;
    storing, once the access from the initial operating system is remapped to the duplicated operating system, a temporary operating system on to the partition;
    rebooting into the temporary operating system;
    operating through the temporary operating system, in response to the rebooting into the temporary operating system, and storing a restore operating system into the partition; and
    rebooting, in response to the storing of the restore operating system, into the restore operating system;
    wherein the remapping comprises remapping the access from the initial operating system to the duplicate operating system on the same partition such that continued operations attempting to access the initial operating system continue to function appropriately by accessing the duplicate operating system without rebooting.

2. The method of claim 1, further comprising:
    operating the temporary operating system completely from a random access memory while performing the storing of the restore operating system into the partition and storing the restore operating system on the partition over the temporary operating system stored on the partition.

3. The method of claim 1, further comprising:
    detecting an activation through the initial operating system image of an executable to initiate restoring of the restore operating system and the detecting comprises receiving an activation request from over a distributed network from a remote device coupled with the distributed network.

4. The method of claim 1, wherein the remapping to the duplicate operating system comprises remapping using a filter driver operating on the partition to control access to the partition and redirect access from the initial operating system to the duplicate operating system.

5. The method of claim 1, further comprising:
    monitoring and controlling access to the partition while access to the initial operating system is remapped to the duplicate operating system comprising allowing write operations to pass through to memory blocks that have yet to be remapped and buffering write requests directed to memory blocks that have been remapped and buffering content to be written associated with those write requests buffered.

6. The method of claim 1, further comprising:
    rolling back, following the rebooting into the restore operating system, changes made to the partition after the rebooting into the temporary operating system and before rebooting into the restore operating system.

7. The method of claim 1, wherein the duplicating, the remapping, and the storing and booting the temporary operating system are implemented without up-dating a master boot record.

8. A method for use in restoring an active partition, comprising:
    identifying available memory within a partition;
    duplicating, in response to identifying the available memory, an initial active operating system image into the identified available memory providing a duplicate operating system;
    remapping, in response to the duplicating the initial operating system, access from the initial operating system to the duplicate operating system;
    storing, once the access from the initial operating system is remapped to the duplicated operating system, a temporary operating system on to the partition;
    rebooting into the temporary operating system;
    operating through the temporary operating system, in response to the rebooting into the temporary operating system, and storing a restore operating system into the partition;
    rebooting, in response to the storing of the restore operating system, into the restore operating system; and
    rolling back, following the rebooting into the restore operating system, changes made to the partition after the rebooting into the temporary operating system and before rebooting into the restore operating system.

9. The method of claim 8, wherein the duplicating, the remapping, and the storing and booting the temporary operating system are implemented without up-dating a master boot record.

10. A method for use in restoring an active partition, comprising:
    identifying available memory within a partition;
    duplicating, in response to identifying the available memory, an initial active operating system image into the identified available memory providing a duplicate operating system;
    remapping, in response to the duplicating the initial operating system, access from the initial operating system to the duplicate operating system;
    storing, once the access from the initial operating system is remapped to the duplicated operating system, a temporary operating system on to the partition;

rebooting into the temporary operating system;
operating through the temporary operating system, in response to the rebooting into the temporary operating system, and storing a restore operating system into the partition; and
rebooting, in response to the storing of the restore operating system, into the restore operating system;
wherein the duplicating, the remapping, and the storing and booting the temporary operating system are implemented without up-dating a master boot record.

11. The method of claim 10, wherein the storing the temporary operating system comprises storing the temporary operating system over at least a portion of the initial operating system while access is remapped to the duplicate operating system, and the storing the restore operating system comprises storing a restore image comprising the restore operating system over the temporary operating system stored on the partition.

12. The method of claim 10, further comprising:
rolling back, following the rebooting into the restore operating system, changes made to the partition after the rebooting into the temporary operating system and before rebooting into the restore operating system.

13. A method for use in performing an active volume restore, comprising:
actively running an initial operating system in an active partition;
duplicating the initial operating system in the partition;
remapping access to the initial operating system to the duplicate operating system;
writing a temporary operating system over at least a portion of the initial operating system;
rebooting the system into the temporary operating system;
through the temporary operating system copying a restore operating system into the partition;
rebooting into the restore operating system;
wherein the remapping comprises remapping the access to the initial operating system to the duplicate operating system such that continued operations attempting to access the initial operating system continue to function appropriately by accessing the duplicate operating system; and
the writing the temporary operating system comprises writing, while access is remapped to the duplicate operating system, the temporary operating system over the at least the portion of the initial operating system.

14. The method of claim 13, further comprising:
parsing the active partition; and
identifying storage in the partition capable of storing a duplicate of the initial operating system, and the duplicating comprises duplicating the initial operating system to the identified storage.

15. The method of claim 13, further comprising:
identifying the restore operating system that is to be restored from a selection of potential restore operating systems.

16. The method of claim 13, wherein the rebooting the system into the temporary operating system and the rebooting into the restore operating system comprises rebooting without additional external interaction.

17. The method of claim 13, further comprising:
accessing a remote storage device through a distributed network; and
retrieving the restore operating system from the remote storage device.

18. The method of claim 13, wherein the restore operating system comprises an upgrade.

19. The method of claim 13, further comprising:
rolling back, following the rebooting into the restore operating system, changes made to the partition after the rebooting into the temporary operating system and before rebooting into the restore operating system.

20. The method of claim 8, wherein the duplicating, the remapping, the writing the temporary operating system and the rebooting the system into the temporary operating system are implemented without up-dating a master boot record.

* * * * *

UNITED STATES PATENT AND TRADEMARK OFFICE
CERTIFICATE OF CORRECTION

PATENT NO. : 7,509,530 B2  Page 1 of 1
APPLICATION NO. : 11/039388
DATED : March 24, 2009
INVENTOR(S) : Welts It is certified that error appears in the above-identified patent and that said Letters Patent is hereby corrected as shown below:

On the TITLE PAGE:
Item (56) References Cited, U.S. PATENT DOCUMENTS, after "6,336,174 B1 1/2002 Li et al" insert --6,473,655 B1 10/2002 Gould et al.--.

Signed and Sealed this

Seventh Day of July, 2009

JOHN DOLL
*Acting Director of the United States Patent and Trademark Office*